July 30, 1968  WOLF-DIETER BENSINGER  3,394,682
FAN ARRANGEMENT FOR COOLING OF INTERNAL COMBUSTION ENGINE
Filed May 27, 1966
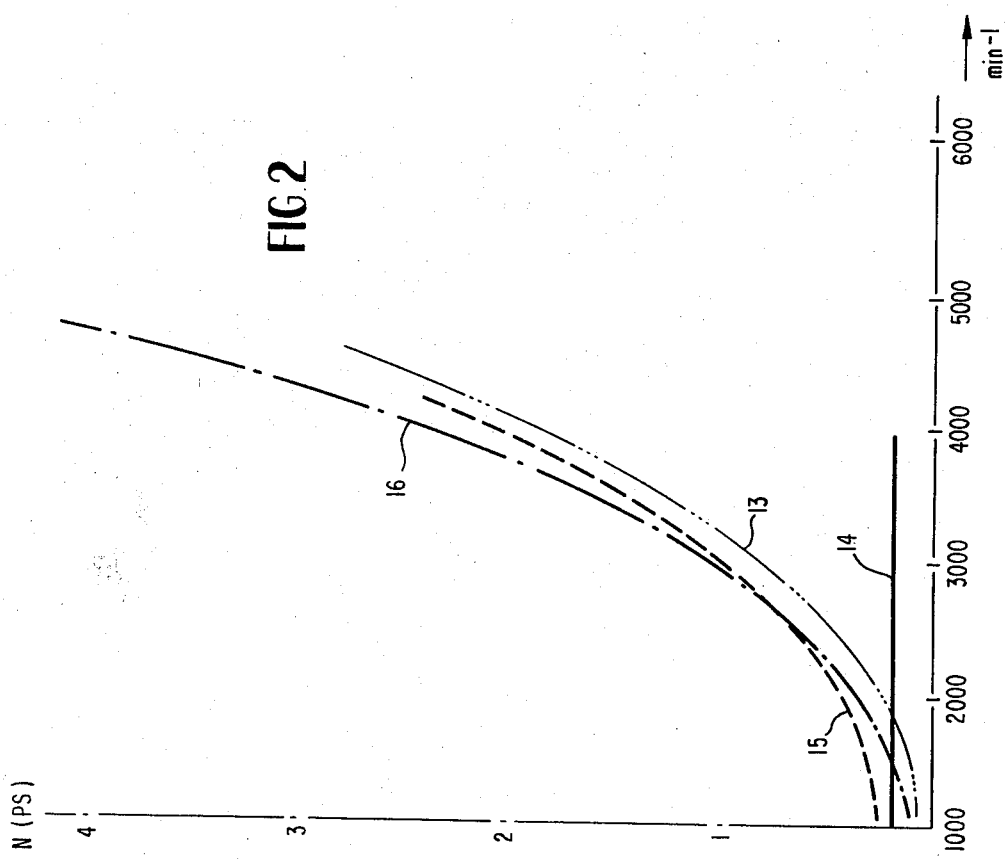
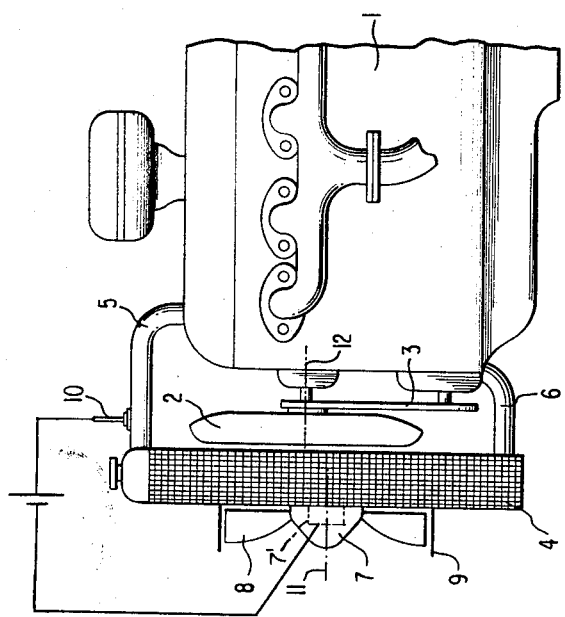
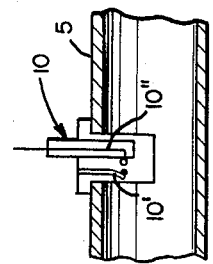
INVENTOR.
WOLF-DIETER BENSINGER
BY
ATTORNEYS

United States Patent Office 3,394,682
Patented July 30, 1968

3,394,682
FAN ARRANGEMENT FOR COOLING OF INTERNAL COMBUSTION ENGINE
Wolf-Dieter Bensinger, Stuttgart-Riedenberg, Germany, assignor to Daimler-Benz Aktiengesellschaft, Stuttgart-Unterturkheim, Germany
Filed May 27, 1966, Ser. No. 553,496
Claims priority, application Germany, June 16, 1965, D 47,518
6 Claims. (Cl. 123—41.12)

ABSTRACT OF THE DISCLOSURE

An arrangement for the cooling of internal combustion engines, particularly the high performance engines used in motor vehicles, including a low output ventilating fan operatively connected with the engine and a second ventilating fan of higher output, driven by an electric motor actuated by a thermosensing device at a predetermined temperature level of the cooling medium. In accordance with the present invention, the second ventilating fan is driven by the electric motor independent of the ignition circuit of the motor vehicle.

The present invention relates to a fan arrangement for the cooling of internal combustion engines, especially in motor vehicles of the higher performance or higher power class.

With motor vehicles of the higher power or performance class, high-output or heavy duty fans are needed for the cooling of the engine which entail the disadvantage that they produce very strong noises that are not tolerable continuously for the passengers of the vehicle. Hence, it has been proposed heretofore in some cases with water-cooled engines to provide couplings or clutches which set the fan into operation only upon exceeding a certain cooling-water temperature. However, with such prior art arrangement the disadvantage could not be avoided that the cooling effect of the fan was merely inadequate or insufficient within the lower rotational speed range of the engine because the output of the fan decreases strongly with a decreasing rotational speed. Also, the further disadvantage that the fan has a very considerable (input) power increase with increasing rotational speed, which entails the danger of possible tearing of the drive belt for the fan, could not be avoided by the solution proposed heretofore.

It has additionally been proposed in the prior art to realize the engine cooling by means of a fan driven from an electric motor because the advantage can be achieved thereby that the fan is independent of the engine rotational speed. However, such proposal entails the disadvantage that the fan, especially during medium and high rotational speeds of the engine, has an inadequate output so that no adequate engine cooling can be realized therewith. At high engine rotational speeds this disadvantage is no longer as weighty because the air velocity necessary for the cooling of the cooling water in the corresponding heat exchanger can be achieved by the dynamic air pressure which occurs at the high speeds of the vehicle generally connected with high engine rotational speeds and high heat development of the engine.

Accordingly, it is the purpose of the present invention to create a fan arrangement which avoids the aforementioned disadvantages and which assures a sufficient and adequate cooling in all rotational speed ranges of the engine. The present invention essentially consists in that a relatively low-output, low-noise fan is coupled to the engine and additionally an electrically driven fan together with appropriate control means are provided which render the electrically driven fan operable when the cooling medium of the engine exceeds a predetermined temperature. An overall fan output is achieved thereby which is greatly superior in the lower rotational speed range to the output of a heavy duty or high-output fan. Nevertheless, an excessive noise development is prevented thereby. Furthermore, the electrically driven, additional fan is considerably less expensive and subject to lesser wear than a coupling or clutch arrangement which engages a high-output fan only when the cooling water temperature has exceeded a predetermined value.

Advantageously provision may also be made in addition thereto that the control means for setting into operation the electric fan are effective independently of the operation of the internal combustion engine because the electrically driven fan can then remain engaged, even after the internal combustion engine is turned off so that no overheating of the internal combustion engine can occur if, for example, the engine is turned off after a long mountain-drive. By reason of the fact that an afterheating of the stationary engine is avoided, i.e., after the vehicle has been brought to a halt, and the engine turned off, one can still further approach the mean cooling-medium temperature of the system to the still permissive value which is still permissive for safety reasons without having to fear that after turning off the engine an overheating thereof may occur. In one particularly advantageous construction of the present invention, a conventional thermal switch is provided supervising the temperature of the cooling medium as control means which, upon reaching a predetermined temperature level in the cooling medium, closes an electric current circuit. This electric current circuit may thereby be independent of the ignition circuit of the engine so that one is assured of the turning on of the additional fan also when the internal combustion engine no longer runs.

The electrically driven fan and the fan coupled with the internal combustion engine may be arranged particularly effectively at the radiator with the axes thereof mutually offset because this assures that as large as possible an area of the radiator surface is loaded or acted upon by the air flowing therethrough. In a simple manner, the electrically driven fan is arranged appropriately in front of the radiator as viewed in the driving direction and the fan coupled to the internal combustion engine behind the radiator.

Accordingly, it is an object of the present invention to provide a fan system for internal combustion engines which is simple in construction yet effectively eliminates the aforementioned shortcomings and drawbacks encountered with the prior art constructions.

Another object of the present invention resides in a fan arrangement for internal combustion engines which assures a completely adequate cooling of the internal combustion engine under all operating conditions, yet avoids the continuous generation of strong noises as occur when a high-output fan is normally turned on.

Another object of the present invention resides in the provision of a fan system for an internal combustion engine, especially for passenger motor vehicles, in which the fan output is properly matched not only to the engine rotational speeds but also to the operating conditions of the engine.

A further object of the present invention resides in a fan system for an internal combustion engine in which failure of the fan belt drive is a result of unduly heavy fan loads is avoided with certainty.

Still another object of the present invention resides in a fan system for an internal combustion engine in which a sufficient cooling of the internal combustion engine is assured at all rotational speeds of the engine without the production of excessive noises.

Still a further object of the present invention resides in a fan system for internal combustion engines in which the fan system is able to provide effective cooling even after the engine has come to a standstill thereby preventing overheating under certain conditions.

These and other objects, features and advantages of the present invention will become more obvious from the following description when taken in connection with the accompanying drawing which shows, for purposes of illustration only, one embodiment in accordance with the present invention, and wherein:

FIGURE 1 is a somewhat schematic partial side elevational view of an internal combustion engine provided with a fan system according to the present invention and arranged at the radiator of the engine, and FIGURE 2 is a diagram indicating the output curve of the fan system according to the present invention as a function of rotational speed of the engine compared to a prior art fan system provided only with a single, belt-driven high-output fan.

FIGURE 3 is an enlarged sectional view of the internal combustion engine incorporating the present invention, particularly illustrating the details of the thermo-respective switch.

Referring now to FIGURE 1 of the drawing, reference numeral 1 designates therein a conventional internal combustion engine which drives, for example, a motor vehicle. A relatively low-output, low-noise fan 2 of conventional construction is driven from the engine 1 by way of a V-belt drive 3; the rotational speed of the fan 2 is thus determined by the rotational speed of the engine 1. The fan 2 is arranged to the rear of the radiator 4 as viewed in the driving direction. The cooling water heated during the operation of the engine 1 flows through the radiator 4 by way of the lines 5 and 6 as is conventional. During the operation of the engine, air is thus sucked through the radiator 4 in dependence on the engine rotational speed.

A fan 8 which is provided in front of the radiator 4 is driven by means of a conventional electric motor 7', preferably built into the hub 7 of the fan 8. The fan 8 is accommodated within a fan housing 9. The fan 8 is set into operation only—and preferably automatically—when the cooling water of the engine 1 exceeds a predetermined temperature. For that purpose, a thermo-element 10 of conventional construction, which supervises the temperature of the cooling water, is inserted into the cooling water line 5. The thermo-element 10 closes an electric contact in a current circuit for energizing the electric motor driving the fan 8 when a predetermined temperature of the cooling water is reached and thus sets the fan 8 into operation by means of the aforementioned electric motor 7'. The thermo-element 10 may comprise two contacts 10' and 10" which are positioned within a housing which projects into the line 5. According to this embodiment, the contact 10' is made up of two metal plates having different co-efficients of thermal expansion. As the temperature of the cooling medium increases, the metal plate facing away from the contact 10" expands to a greater extent so that the contact 10' is straightened and closes the circuit.

The current circuit which is closed by the thermo-element 10 may be arranged independently of the ignition circuit of the engine 1 in order that the electrically driven fan 8 can also remain in operation when the internal combustion engine 1 has come to a standstill after the ignition is turned off.

The fan 8 is arranged offset with its axis 11 with respect to the axis 12 of the fan 2 because a good loading of the radiator surface can be achieved thereby. However, provision may also be made such that the fans 8 and 2 are arranged coaxially to each other, if this should be necessary for constructional reasons. It would also be possible to arrange both the fans 2 and 8 on one side of the radiator 4.

In the diagram according to FIGURE 2, the output curve of the low-output fan 2 driven from the engine 1 by a belt drive 3 is designated by reference numeral 13. Reference numeral 14 designates the output curve of the electrically driven additional fan 8. The sum of the output curves 13 and 14 results in the combined output curve 15. Additionally, in this diagram there is illustrated an output curve 16 of a single high-output fan driven from the internal combustion engine by way of a belt drive which exhibits the disadvantage of a larger noise development than a low-output fan, and which additionally, as mentioned above, may also entail the danger that at higher rotational speeds the belt drive tears by reason of the high load as a result of the power increase. From a comparison of the curve 15 with the curve 16 one can readily recognize that the solution according to the present invention is greatly superior to a single high-output fan in a lower rotational speed range, in the illustrated embodiment approximately in the range below 2700 r.p.m. Only in the rotational speed range in which the cooling output exceeds, in general, the cooling output of the fan by reason of the dynamic air pressure, the solution proposed in accordance with the present invention is slightly inferior to a single high-output fan which, however, has normally no disadvantageous effects within this range.

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. A fan arrangement for cooling internal combustion engines, especially for those in motor vehicles of the high performance class, comprising:
    first ventilating fan means operatively connected to the engine, said first ventilating fan means having a relatively low power output and thus generating a relatively low noise level,
    second ventilating fan means,
    electric motor means for driving said second ventilating fan means,
    temperature responsive means monitoring the temperature of the cooling medium of the engine, and
    an electric current circuit, including said electric motor means and said second ventilating fan means, and means operatively connecting said temperature responsive means with said current circuit in such a manner that the current circuit is closed when a predetermined temperature limit value of the cooling medium is reached, said electric motor thus serving to energize said second ventilating fan means independently of the operation of the engine.

2. An arrangement according to claim 1, wherein the internal combustion engine includes a radiator, and wherein said first and second ventilating fan means are arranged at said radiator with the respective axes thereof offset to one another.

3. An arrangement according to claim 2, wherein said second ventilating fan means is arranged in front of the radiator as viewed in the driving direction and said first ventilating fan means behind said radiator.

4. A fan arrangement for cooling internal combustion engines, especially in motor vehicles belonging to the higher performance class, comprising relatively low-output, low-noise fan means which is operatively connected to the engine, an additional electrically driven fan, and control means operatively connected with said electrically driven fan for rendering said fan operable only when the cooling medium of the engine exceeds a predetermined temperature, wherein the internal combustion engine includes a radiator, and wherein said electrically driven fan and said fan means are arranged at said radiator with the respective axes thereof offset to one another.

5. An arrangement according to claim 4, wherein said electrically driven fan is arranged in front of the radiator as viewed in the driving direction and said fan means behind said radiator.

6. An arrangement according to claim 5, in which said control means is operable independently of the operation of the engine.

References Cited
UNITED STATES PATENTS

| | | | |
|---|---|---|---|
| 1,900,586 | 3/1933 | Rippe | 236—35 |
| 1,920,883 | 8/1933 | Perkins | 123—41.49 |
| 2,902,986 | 9/1959 | Kloss | 123—41.12 |

FOREIGN PATENTS

| | | |
|---|---|---|
| 819,340 | 9/1959 | Great Britain. |
| 905,002 | 9/1962 | Great Britain. |

AL LAWRENCE SMITH, *Primary Examiner.*